Aug. 29, 1967  P. A. SLUSE  3,338,556
SUPPORT FIXTURE FOR AUTOMOBILE COMPONENTS
Filed April 1, 1966  2 Sheets-Sheet 1
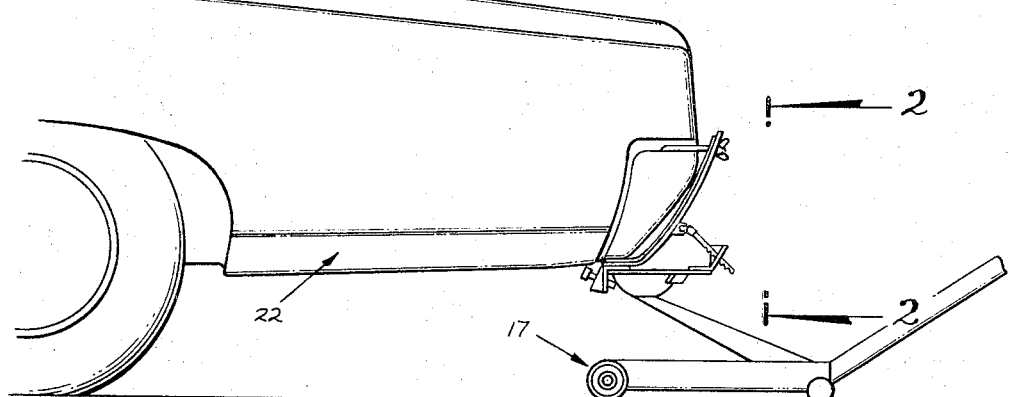
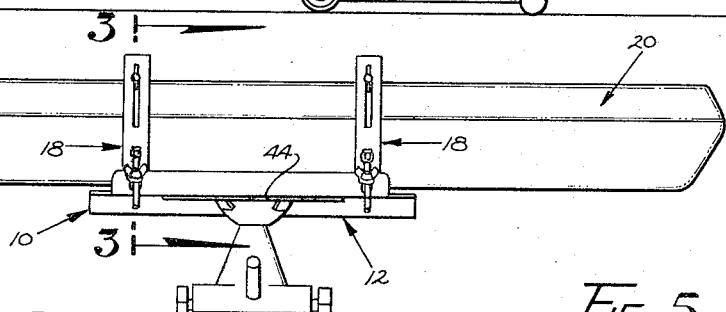
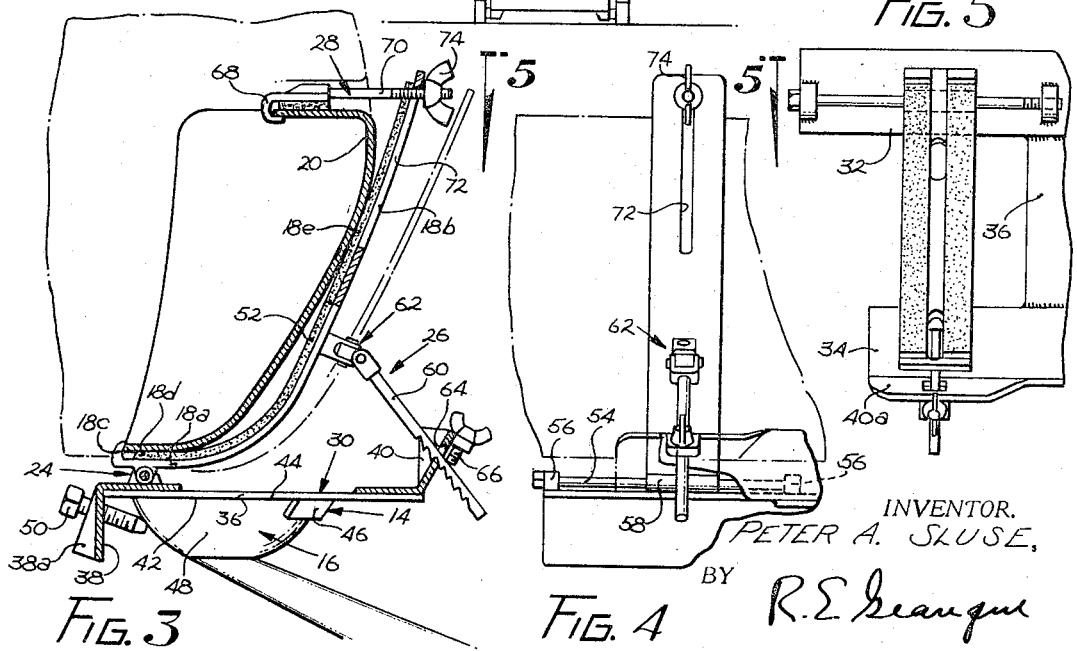
INVENTOR.
PETER A. SLUSE,
BY R. E. Geauque
ATTORNEY

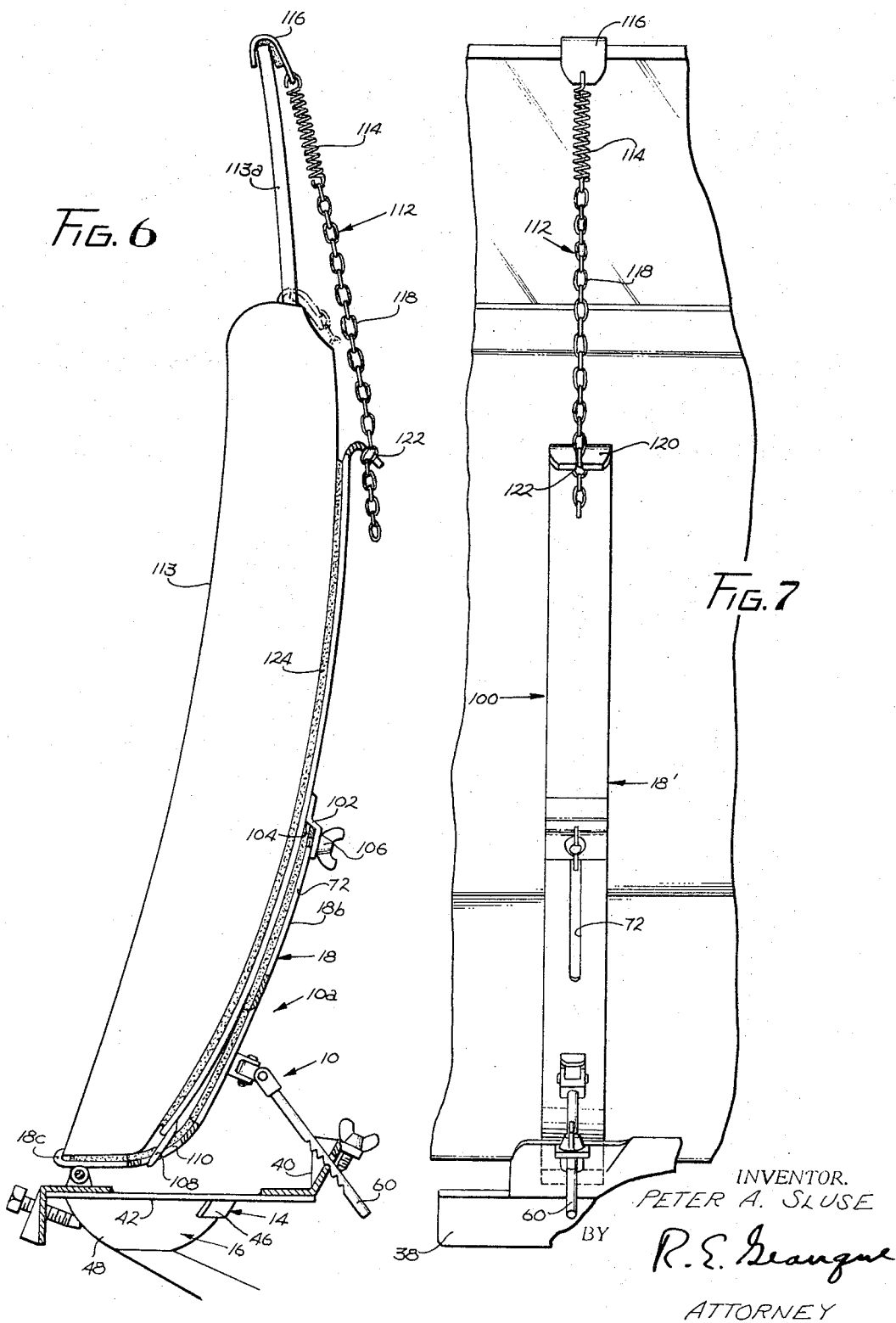

United States Patent Office 3,338,556
Patented Aug. 29, 1967

3,338,556
SUPPORT FIXTURE FOR AUTOMOBILE COMPONENTS
Peter A. Sluse, 6652 Darby Ave., Apt. 17, Reseda, Calif. 91335
Filed Apr. 1, 1966, Ser. No. 539,492
14 Claims. (Cl. 254—134)

This invention relates generally to a fixture for aiding the repair of automotive vehicles. More particularly, the invention relates to a fixture of this class for supporting automotive vehicle components, such as doors, bumpers, and the like, in position for attachment to the vehicle body.

In the past, attachments of doors, bumpers, and other similar components to the body of automotive vehicles has been difficult and time-consuming. This is due to the fact that such attachment requires accurate stationary positioning of the components relative to the vehicle body, which is difficult to achieve owing to the relatively large size and heavy weight of these components. A variety of tools or fixtures have been devised to alleviate this difficulty. Generally speaking, these fixtures comprise a jack of some type for supporting the vehicle components in an elevated position for attachment to the vehicle body. The existing fixtures of this kind, however, are not totally satisfactory owing to their relatively high cost, complexity, difficulty of use, and/or lack of adjustability to accommodate vehicle components of different size and types. Accordingly, there is a need for an improved fixture of the type under discussion.

It is a general object of this invention to provide such an improved fixture.

A more specific object of the invention is to provide a fixture which is effective to support automotive vehicle components in elevated position for attachment to the vehicle body.

A related object of the invention is to provide a fixture of the character described which is particularly adapted for aiding in the installation of doors, bumpers, and the like, on the bodies of automotive vehicles.

A further object of the invention is to provide a fixture of the character described which is adjustable to accommodate the fixture to automotive vehicle components of different size, shape and type.

Yet a further object of the invention is to provide a fixture of the character described which is relatively simple in construction, economical to manufacture, easy to use, compact in size, and otherwise ideally suited for its intended purposes.

Other objects, advantages, and features of the invention will become readily evident as the description proceeds.

With these and such other objects in view, the invention consists in the construction, arrangement, and combination of the various parts of the invention, whereby the objects contemplated are attained, as hereinafter set forth, pointed out in the appended claims, and illustrated in the accompanying drawings.

In these drawings:
FIGURE 1 is a side elevation of an improved fixture according to the invention illustrating the manner in which the fixture is employed to install a bumper on an automotive vehicle;
FIGURE 2 is a view looking in the direction of the arrows on line 2—2 in FIGURE 1;
FIGURE 3 is an enlarged section taken on line 3—3 in FIGURE 2;
FIGURE 4 is a fragmentary rear elevation of the fixture looking from the right in FIGURE 3;
FIGURE 5 is a view taken on line 5—5 in FIGURE 4;
FIGURE 6 is an enlarged side elevation of the improved fixture of FIGURES 1 through 5 illustrating hte manner in which the fixture is employed to install a door on an automotive vehicle; and
FIGURE 7 is a rear elevation of the fixture looking from the right in FIGURE 6.

The improved fixture 10 of the invention illustrated in FIGURES 1 through 5 of these drawings comprises an elongated, normally horizontal bracket 12 having front and rear sides. The front side of this bracket is to the left and the rear side is to the right in FIGURES 1 and 3. Bracket 12 has mounting means 14 for attaching the bracket to the elevatory load-supporting head 16 of a hydraulic jack 17. Disposed above and spaced along the bracket 12 are a pair of cradle members 18 for cradling and supporting an automotive vehicle component 20 to be attached to the body of an automotive vehicle 22. In FIGURES 1 through 5, the vehicle component 20 is the rear vehicle bumper.

Each cradle member 18 is generally L-shaped in side elevation and includes a relatively short and normally generally horizontal lower cradle leg 18a, a relatively long upstanding upper cradle leg 18b secured to the rear end of and rising above the lower cradle leg, and an upstanding lip 18c along the front end of the lower leg. The legs 18a, 18b of each cradle member 18 are disposed in a common normally generally vertical plane approximately perpendicular to the longitudinal axis of the bracket 12. The lower legs 18a of the cradle members 18 have upwardly presented supporting surfaces 18d. The upper cradle legs 18b have forwardly presented supporting surfaces 18e.

The forward ends of the lower legs 18a of the cradle members 18 are pivotally attached by hinge means 24 to the bracket 12 for swinging of the cradle members relative to the bracket, in the fore and aft direction of the bracket, on pivot axes generally parallel to the longitudinal axis of the bracket. In the particular fixture 10 illustrated, the cradle members pivot on substantially a common pivot axis which is located adjacent the front side of the bracket. Operatively connected between the rear sides of the cradle members 18 and the rear side of the bracket 12 are adjustable positioning means 26 for securing the cradle members in a fixed angular position relative to the bracket. The upper ends of the upper cradle legs 18b carry fastening means 28 which are adapted for attachment to the automotive vehicle component, or bumper, 20 to be installed.

In use of the fixture 10, the fixture bracket 12 is attached, by the bracket mounting means 14, to the head 16 of the jack 17. The vehicle component, or bumper 20 to be installed is then positioned in the cradle member 18, in the manner best illustrated in FIGURE 3. As shown in this latter figure, when the bumper is properly supported in the cradle members, the lower edge of the bumper rests on the upper surfaces 18d of the lower cradle legs 18a and the side surface of the bumper (i.e., the rear surface of the illustrated bumper) rests against the front surfaces 18e of the upper cradle legs 18b. The fastening means 28 extend across the upper side of the bumper and engage over the rear upper edge of the bumper, as illustrated. As will appear presently, these fastening means may be tightened to firmly clamp the bumper to the cradle members. During tightening of these fastening means, the lower front edge of the bumper is urged against the retaining lips 18c on the cradle members, whereby the bumper is rigidly attached to the cradle members. After the bumper 20 has thus been attached to the cradle members, the cradle member positioning means 26 are adjusted to locate the bumper at the proper angle for attachment to the automotive vehicle 22. The load-supporting head 16 of the jack is then raised or lowered, as the case may be, to locate the bumper at the proper elevation for attachment to the vehicle. The jack is then maneuvered to locate the bumper in position for attachment to the vehicle.

Referring now in greater detail to the illustrated fixture 10, the fixture bracket 12 will be observed to comprise a generally flat base portion 30 including parallel front and rear supporting bars 32, 34 joined by a central plate 36. The plate and bars may be joined by welding, as shown. Along the front edge of the base portion 30 is a depending reinforcing flange 38. Along the rear edge of the base portion is an upstanding reinforcing flange 40. The center of the front flange 38 is offset forwardly to form a forwardly inclined flange portion 38a located on the fore and aft center line of the bracket 12. Opposite ends of the rear flange 40 are rearwardly offset to form rearwardly inclined flange portions 40a. The underside of the base plate 36 has a central seating surface area 42 which is adapted for seating contact with the upper load-supporting surface 44 of the jack head 16. For reasons which will appear presently, the center of the surface area 42 is located approximately at the intersection of the fore and aft center line of the bracket 12 and a given longitudinal axis of the bracket.

The mounting means 14 for securing the bracket 12 to the jack head 16 comprise a pair of depending lugs 46 on the underside of the bracket base plate 36. These lugs are located approximately equal radial distances from the center of the seating surface area 42 and are spaced approximately 120° apart, about this center, and approximately 60° to opposite sides of the fore and aft center line of the bracket 12. The jack 17 illustrated comprises a hydraulic jack wherein the jack head 16 has a generally hemispherical shape and a spherically curved surface 48. The bracket lugs 46 incline forwardly, at an acute angle to the plane of the bracket base portion 30, to engage the rear side of the spherical jack head surface 48. The inclined portion 38a of the front bracket flange 38 is spaced approximately 120° from the bracket lugs 46. Threaded in the flange portion 38a is a clamp screw 50 which is disposed for clamping engagement with the front side of the spherical jack head surface 48. It is evident at this point that the bracket mounting means 14 are effective to releasably secure the fixture bracket 12 to the load-supporting head 16 of the jack 17. It is further evident that when the fixture 10 is thus secured to the jack, the bracket is centered endwise relative to the jack head 16.

The cradle members 18 comprise metal straps which are bent into the generally L-shape illustrated to define the lower and upper cradle legs 18a and 18b. Preferably, the junctures of the cradle legs, and the upper cradle legs 18b, are curved to the arcuate configuration illustrated. The front retaining lips 18c on the cradle members may be formed by bending upwardly the front ends of these metal cradle straps. Strips 52 of resilient cushioning material are preferably adhesively bonded or otherwise secured to the upwardly and forwardly presented surfaces of the cradle legs 18a, 18b.

The hinge means 24 for each cradle member 18 comprises a hinge pin 54 which extends lengthwise of the fixture bracket 12, adjacent the front edge of the bracket base portion 30, and is supported at its ends in upstanding lugs 56 on the base portion. Fixed to the underside of each lower cradle leg 18a is a lug 58 which extends normal to the plane of the respective cradle member and is axially bored to rotatably receive the respective hinge pin 54. In the particular fixture 10 illustrated, the two hinge pins 54 for the cradle members are axially aligned. It is evident at this point, therefore, that the hinge pins 54 pivotally support the cradle members 18 for fore and aft swinging movement relative to the bracket 12 on substantially a common pivot axis extending lengthwise of the bracket. It is significant to note that the length of the hinge pins 54 is substantially greater than the length of the cradle lugs 58 which rotatably receive the hinge pins, whereby the cradle members 18 are adjustable axially of the hinge pins and, thereby, longitudinally of the bracket 12.

The positioning means 26 for each cradle member 18 comprises a rod 60 which extends, at an angle to the horizontal, between the respective cradle members and the rear bracket flange 40. The upper end of each positioning rod 60 is joined, by a universal connection 62, to the rear side of the respective upper cradle leg 18b. The lower end of each rod 60 extends through an opening 64 in the adjacent rear inclined flange portion 40a. The lower ends of the rods 60 are serrated, as shown. Threaded in the rear bracket flange 40, over each rod 60, is a clamp screw 66 for urging the serrated edge of the adjacent rod into engagement with the lower edge of the respective rod opening 64 in the flange 40, thus to rigidly secure the rod to the flange. It will be observed that the openings 64 in the rear bracket flange 40 are substantially larger than the cradle positioning rods 60, whereby these rods may move angularly relative to the flange. This angular movement of the rods and the universal connections 62 between the rods and the cradle members 18 accommodate adjustment of the latter members lengthwise of the fixture bracket 12, in the manner explained earlier.

In the fixture of FIGURES 1 through 5, the fastening means 28 on the upper ends of the upper cradle legs 18b comprise hook members 68 having rearwardly extending threaded shanks 70. The hook shanks 70 extend through longitudinal slots 72 in the upper cradle legs 18b and mount wing nuts 74 which seat against the rear surfaces of the latter legs.

When the bumper 20 is supported, in the manner explained earlier, in the cradle members 18, the hook members 68 of the upper fastening means 28 are engaged over the upper front edge of the bumper, as shown. The wing nuts 74 on these hook members are then tightened to draw the bumper rearwardly against the upper cradle legs 18b. This action urges the lower front edge of the bumper into seating contact with the front lips 18c on the cradle members, whereby the bumper is rigidly attached to the cradle members, as mentioned earlier. As heretofore noted, and as is now evident, the cradle member positioning means 26 are adjustable to secure the cradle members 18 in various angular positions relative to the fixture bracket 12. The positioning means also permit adjustment of the cradle members lengthwise of the bracket. The slots 72 in the cradle members permit adjustment of the fastening means 28 lengthwise of the upper cradle legs 18b. The various adjustments obviously accommodate the present fixture to bumpers of various sizes and shapes.

As noted earlier, the center of the seating surface area 42 of the fixture bracket 12 is located approximately at the intersection of the fore and aft center line of the bracket and a given longitudinal axis of the bracket. The legs 18a, 18b of each cradle member extend to opposite sides of this given longitudinal axis. This permits the center of mass of the bumper 20 to be located approximately over the center of the seating surface area 42. As a consequence, when the bumper 20 is secured to the fixture 10, and the latter is supported on the jack head 16, the moments on the bracket, about the jack head, are substantially balanced, whereby maximum stability of the bumper is achieved during attachment of the latter to the vehicle 22.

The fixture device 10a illustrated in FIGURES 6 and 7 of the drawings is particularly adapted for aiding the installation of automobile doors. This fixture device comprises a basic fixture 10 which is substantially identical to that just described and a pair (only one shown) of upper cradle leg extensions 100. Each cradle leg extension comprises a metal strap which is substantially longer than the upper cradle legs 18b of the fixture 10, and is bent to substantially the same curvature as the outer surface of the door to be installed. The cradle leg extensions 100 seat against the front surfaces of the upper cradle legs 18b, respectively, and are releasably secured to these latter cradle legs by means including brackets 102 welded to the rear surfaces of the extensions, about midway between their ends. Each extension bracket 102 defines, with its respective extension 100, a downwardly opening channel 104 for receiving the upper end of the adjacent upper cradle leg 18b. Threaded in each bracket 102 is a clamp screw 106 for securing the corresponding extension 100 to its respective upper cradle leg 18b. Welded to and extending beyond the lower end of each cradle leg extension 100 is a pin 108 which extends through a longitudinal slot 110 in the adjacent cradle member 18 to retain the lower end of the extension in co-planar relation with the respective cradle member.

Secured to the upper end of each cradle leg extension 100 is a fastening means 112 which is adapted for attachment to the upper edge of the automobile door 113 to be installed. Each fastening means 112 comprises a coil spring 114 having a hook member 116 secured to one end thereof. Secured to the opposite end of each spring 114 is a chain 118. The free ends of the fastener chains 118 are adjustably secured to the upper ends of the cradle leg extensions 100, respectively. To this end, the upper extremities of these extensions are bent rearwardly at 120 and notched at 122 to receive links of the chains 118. It is evident at this point, therefore, that the effective length of each fastening means 112, between its respective hook member 116 and the adjacent extension 100, may be adjusted by engaging different links of its chain 118 in the extension notch 122. Preferably, a strip 124 of resilient cushioning material is secured to the front surface of each cradle leg extension 100. It is evident at this point that the fixture device 10a, just described, comprises cradle members 18' which includes the cradle member 18 of the fixture 10 proper and the cradle leg extension 100. The upper legs of the cradle members 18' are formed by the upper cradle legs 18b and the cradle leg extensions. Accordingly, the cradle legs 18b define, in effect, the lower sections of the upper legs of the cradle members 18'.

In use, the automobile door 113 to be installed is positioned in the cradle members 18' in the manner illustrated in FIGURE 6. The hooks 116 on the upper fastening means 112 are engaged over the upper edge of the door window 113a, in the manner illustrated in solid lines in FIGURE 6, or over the upper edge of the door, in the manner illustrated in phantom lines in the figure. The effective length of the fastening means 112 are adjusted, in the manner explained earlier, so that when the fastener hooks 116 are thus engaged with the door, the fastener springs 114 are stretched. The door 113 is thereby resiliently urged rearwardly into contact with the cradle leg extensions 100 and the lower edge of the door is urged forwardly into seating contact with the lips 18c on the lower front ends of the cradle members 18, thus to firmly secure the door to the cradle members. The door may then be vertically and angularly positioned, in much the same way as described earlier in connection with installation of the bumper 20, for attachment to the vehicle 22.

It is now obvious, therefore, that the invention herein described and illustrated is fully capable of attaining the several objects and advantages preliminarily set forth.

While the presently preferred embodiment of the invention has been disclosed for illustrative purposes, it is obvious that various modifications in the design, arrangement of parts, and instrumentalities of the invention are possible within the spirit and scope of the following claims.

What is claimed as new in support of Letters Patent is:

1. A fixture to be used in conjunction with a jack having an elevatory load-supporting head for supporting automotive vehicle components, such as doors, bumpers, and the like, in position for attachment to the vehicle, comprising:

an elongate, normally horizontal bracket having front and rear sides;
mounting means on said bracket for attaching said bracket to the load-supporting head of said jack;
a pair of upstanding, generally L-shaped cradle members disposed above and spaced along said bracket for cradling and supporting said component;
each said cradle member including a relatively short and normally generally horizontal lower cradle leg, a relatively long upstanding upper cradle leg secured to one end of and rising above said lower leg, and an upstanding retaining lip along the opposite end of said lower leg;
said legs of each cradle member being disposed in a common, normally generally vertical plane approximately normal to the longitudinal axis of said bracket, said lower cradle legs extending forwardly relative to said bracket from the lower ends of said upper cradle legs;
said lower cradle legs having upwardly presented supporting surfaces and said upper cradle legs having forwardly presented supporting surfaces;
hinge means pivotally connecting said lower cradle legs to said bracket for swinging of said cradle members relative to said bracket, in the fore and aft direction of said bracket, on pivot axes generally parallel to the longitudinal axis of said bracket;
adjustable positioning means operatively connected between said cradle members and said bracket for adjustably securing said cradle members in fixed angular position relative to said bracket;
said cradle members being adapted to cradle and support said component with the latter resting on said upwardly presented surfaces of said lower cradle legs and against said forwardly presented surfaces of said upper cradle legs; and
fastening means secured to the upper ends of said upper cradle legs for releasable attachment to said component.

2. A fixture according to claim 1 wherein:
the load-supporting head of said jack comprises a generally hemispherical member with a lower generally hemispherically curved surface and an upper load-supporting surface;
said bracket has a lower seating surface area for seating contact with said load-supporting surface of said jack head; and
said mounting means comprise a pair of depending lugs on the undersurface of said bracket having surfaces disposed at acute angles to said seating surface area for engaging said spherically curved jack head surface at positions spaced circumferentially about said head and a clamp screw threaded in said bracket opposite said lugs for clamping engagement with said jack head.

3. A fixture according to claim 1 wherein:
said legs of each cradle member are curved and said forwardly presented surfaces of said upper cradle legs have a concave curvature.

4. A fixture according to claim 1 wherein:
said cradle members comprise metal straps having cushioning means applied to the upwardly and forwardly presented surfaces of their respective cradle legs.

5. A fixture according to claim 1 wherein:
said fastening means comprise hook members adapted for engagement with said component and having threaded shanks extending through openings in the upper ends of said upper cradle legs, respectively, and nuts threaded on said shanks rearwardly of said upper cradle legs.

6. A fixture according to claim 5 wherein:
said openings comprise longitudinal slots in said upper cradle legs, respectively, whereby said hook members are adjustable longitudinally of said upper cradle legs.

7. A fixture according to claim 1 wherein:

said fastening means comprise coil springs, means securing one end of said coil springs to the upper ends of said upper cradle legs, respectively, and hook members secured to the other ends of said coil springs.

8. A fixture according to claim 7 wherein:

said means securing said one end of said springs to said upper cradle legs are adjustable to vary the effective length of said fastening means between said hook members and the upper ends of the respective upper cradle legs.

9. A fixture according to claim 1 wherein:

said hinge means for each cradle member includes means for accommodating adjustment of the respective cradle member longitudinally of said bracket.

10. A fixture according to claim 9 wherein:

said positioning means comprise rods extending between said bracket and the rear sides of said upper cradle legs, respectively, universal connections between said upper cradle legs and the adjacent ends of the respective rods, and adjustable means securing the other ends of said rods to said bracket in such manner as to permit both angular and longitudinal adjustment of said rods relative to said bracket.

11. A fixture according to claim 1 wherein:

said upper leg of each cradle member comprises a lower leg section integrally joined to said one end of the corresponding lower cradle leg, an upper leg extension extending beyond the upper end of said lower leg section, and releasable connecting means joining said leg extension to said leg section;

said fastening means are secured to the upper ends of said leg extensions, respectively;

said leg extensions adapt said fixture for installing automobile doors and said extensions being removable from said fixture to condition said fixture for installing automobile bumpers; and the upper ends of said lower leg sections have means for receiving bumper-engaging fastening means when said extensions are removed.

12. A fixture according to claim 11 wherein:

said releasable connecting means for each said cradle leg extension comprises a bracket member defining with the respective extension a downwardly opening channel receiving the upper end of the adjacent lower leg section, a clamp screw carried by said bracket member for clamping engagement with the adjacent leg section, and means on the lower end of the respective extension for retaining the latter in coplanar relation with the corresponding cradle member.

13. A fixture according to claim 1 wherein:

the load-supporting head of said jack has an upper, normally generally horizontal load-supporting surface;

said bracket comprises a generally flat normally horizontal base portion having front and rear edges and a lower seating surface area for seating contact with said upper jack head surface;

said seating surface area has its center located approximately at the intersection of the fore and aft center line of said bracket and a given longitudinal axis of said bracket;

said mounting means are carried on said base portion in a position to secure said base portion to said jack head with said seating surface area disposed in seating contact with said upper jack head surface;

said cradle members are pivotally attached to said base portion adjacent the front edge thereof; and said upper and lower cradle legs of each cradle member are located at opposite sides of said given longitudinal axis, whereby said automotive component may be supported on said cradle members with the center of mass of said component located approximately over the center of said seating area, thus to approximately balance the moments on said bracket about said jack head.

14. A fixture according to claim 13 in combination with:

a hydraulic jack having an elevatory head disposed in seating contact with said seating surface area of said base portion and secured by said mounting means to said bracket.

References Cited
UNITED STATES PATENTS

| | | | |
|---|---|---|---|
| 2,747,837 | 5/1956 | Turner | 254—134 |
| 3,220,565 | 11/1965 | Wells | 214—1 |

OTHELL M. SIMPSON, *Primary Examiner.*